(12) United States Patent
Walsh

(10) Patent No.: US 7,649,617 B2
(45) Date of Patent: Jan. 19, 2010

(54) RETRO DETECTOR SYSTEM

(75) Inventor: Gregory C. Walsh, Walnut Creek, CA (US)

(73) Assignee: Leica Geosystems AG, Heerbrugg (CH)

( * ) Notice: Subject to any disclaimer, the term of this patent is extended or adjusted under 35 U.S.C. 154(b) by 224 days.

(21) Appl. No.: 11/900,063

(22) Filed: Sep. 10, 2007

(65) Prior Publication Data

US 2009/0128797 A1 May 21, 2009

Related U.S. Application Data

(60) Provisional application No. 60/846,444, filed on Sep. 22, 2006.

(51) Int. Cl.
*G01C 3/08* (2006.01)
(52) U.S. Cl. ............... 356/5.01; 356/4.01; 356/4.1; 356/5.1; 356/5.15
(58) Field of Classification Search ........... 356/3.01–22
See application file for complete search history.

(56) References Cited

U.S. PATENT DOCUMENTS

| | | | |
|---|---|---|---|
| 4,733,969 A * | 3/1988 | Case et al. ............ | 356/623 |
| 5,838,239 A | 11/1998 | Stern et al. ............ | 340/583 |
| 6,069,565 A * | 5/2000 | Stern et al. ............ | 340/583 |
| 6,163,372 A | 12/2000 | Sallee et al. ........... | 356/5.1 |
| 6,302,355 B1 | 10/2001 | Sallee et al. ........... | 244/3.16 |
| 6,750,953 B1 | 6/2004 | Douglas ............... | 356/4.08 |
| 6,882,409 B1 | 4/2005 | Evans et al. ........... | 356/4.01 |
| 6,917,415 B2 | 7/2005 | Gogolla et al. ......... | 356/5.06 |
| 2004/0051859 A1 | 3/2004 | Flockencier ........... | 356/4.01 |
| 2004/0135992 A1 | 7/2004 | Munro ................ | 356/4.01 |

* cited by examiner

*Primary Examiner*—Thomas H Tarcza
*Assistant Examiner*—Luke D Ratcliffe
(74) *Attorney, Agent, or Firm*—Workman Nydegger

(57) ABSTRACT

A light detection system duplicates the dynamic range of low intensity non-cooperative targets for high intensity cooperative targets. Both dynamic ranges of return light pulses are supported at the same time. In one embodiment, two beam splitters are used to reduce the intensity of reflected light that is received from high intensity sources to levels that can be accurately ranged. Ambiguity between the two paths is resolved by using an additional detector. Alternatively, one beam splitter is used to reduce the intensity of reflected light that is received from high intensity sources to levels that can be accurately ranged. The beam splitter system increases the effective dynamic range of the detection and ranging system passively without any need to reconfigure the system.

4 Claims, 1 Drawing Sheet

RETRO DETECTOR SYSTEM

PRIORITY CLAIM

This application claims the benefit of U.S. Provisional Application No. 60/846,444, filed on Sep. 22, 2006, by Gregory C. Walsh and titled "Retro Detector System." Provisional Application No. 60/846,444 is hereby incorporated by reference herein in its entirety.

TECHNICAL FIELD OF THE INVENTION

The present invention relates to light detection systems and, in particular, to techniques for reducing the intensity of light received by a light detection system to levels that can be accurately ranged.

BACKGROUND OF THE INVENTION

Light detection systems are being increasingly utilized in a wide variety of applications.

In one such light detection system, Light Imaging Detecting And Ranging (LIDAR) scanning, a scanner launches a laser beam that scans across a scene that encompasses a target object and measures light reflected back from a large number of points that lie on surfaces visible in the scene. Each scan point from which reflected light is received by the scanning system has a measured location in three dimensional (3D) space, to within some measurement error, that typically is recorded relative to a point (x,y,z) in the local coordinate system of the scanner. LIDAR systems are described, for example, in U.S. Pat. No. 5,988,862, issued Nov. 3, 1999, titled "INTEGRATED SYSTEM FOR QUICKLY AND ACCURATELY IMAGING AND MODELING THREE DIMENSIONAL OBJECTS," which is hereby incorporated herein by reference in its entirety to provide background information regarding the present invention.

In a light detection system, such as the LIDAR scanning system referenced above, the intensity of the return light from a target is typically not known in advance of receiving the light. As a consequence, the light return system must be able to determine the range of return light intensity using as wide a variety of return powers as possible; that is, the system must have as wide a dynamic range as possible. Current light detection systems are able to range with sufficient accuracy on a variety of expected target surfaces and ranges. However, there exist some exceptional so-called cooperative targets, e.g., surveying prisms, that return thousands of times more light than typical non-cooperative targets such as walls, pipes and rock. The light detection techniques provided by the present invention allow a light detection system to duplicate the dynamic range of the low intensity, non-cooperative targets for high intensity cooperative targets. Both dynamic ranges of return pulse light are supported at the same time so that no apriori knowledge of the target is required to accurately range.

In accordance with the invention, one or two beam splitters are utilized to reduce the intensity of reflected light that is received from a high intensity source to levels that can be accurately ranged. The beam splitter system increases the effective dynamic range of the detection and ranging system passively without any need to reconfigure the system.

DETAILED DESCRIPTION OF THE INVENTION

Figure 1:
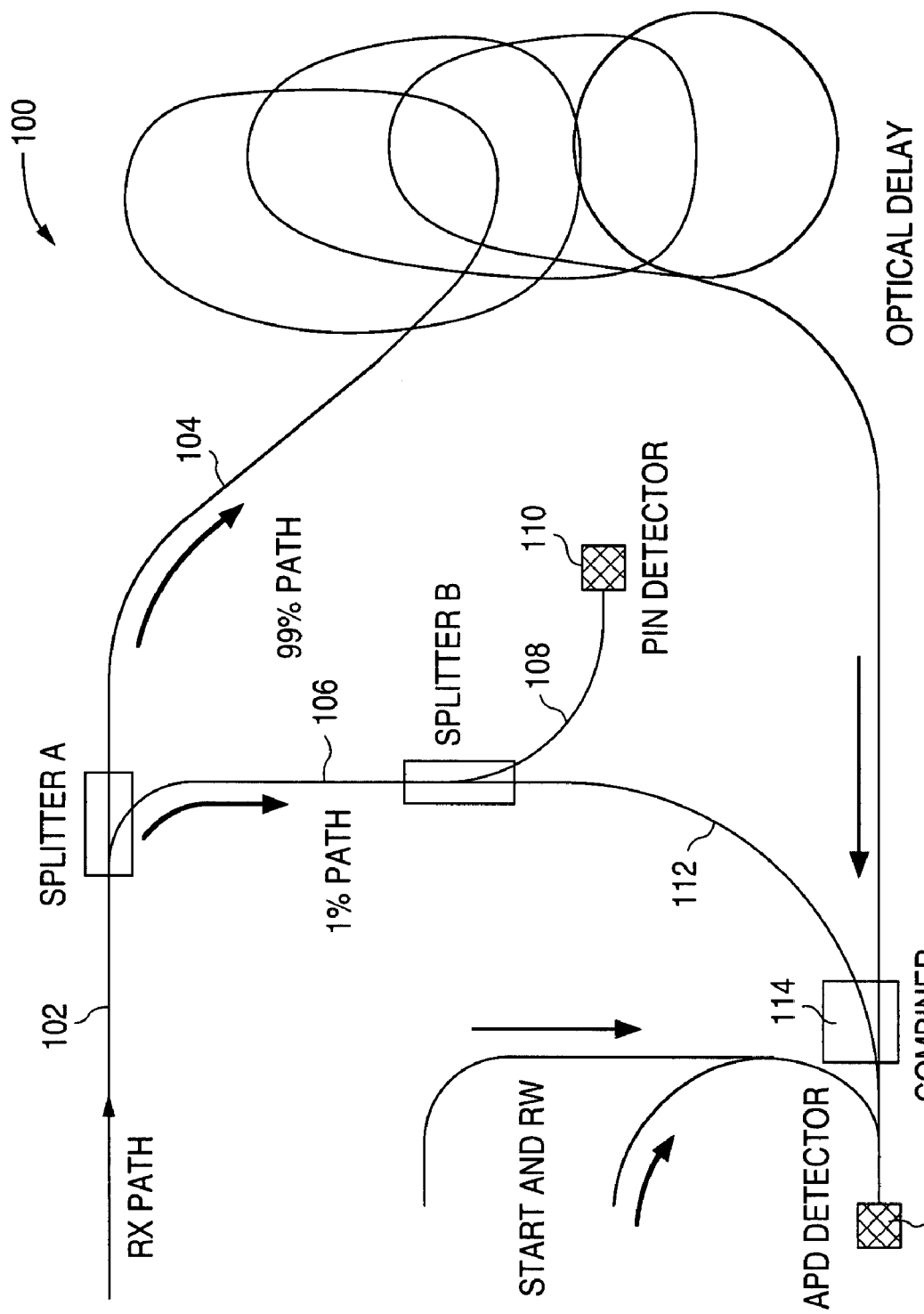
FIG. 1 is a schematic diagram showing an embodiment of a light detection system in accordance with the present invention.

FIG. 1 shows an embodiment of a light detection system 100 in accordance with the present invention in which two different intensity ranges of light return pulses are considered. As discussed in detail below, the two dynamic ranges are supported by using two separate optical return paths, which can be implemented either in fiber optics or in conventional free space. A short optical return path, shown in the FIG. 1 embodiment of the invention as including components 106 and 112, is highly attenuated; a long optical return path, shown in FIG. 1 as including component 104, has very little attenuation. Each return light pulse, regardless of its intensity, travels both optical return paths, thereby resulting in two time-separated pulses arriving at a light detector 116. The first pulse to arrive at the detector 116 travels the short optical return path and is attenuated by a factor larger than the dynamic range of the detector 116 (e.g., 3000×-10000× in the present embodiment). The second pulse to arrive at the detector 116 travels the long optical return path and is not attenuated by any large amount. The time delay between the two pulses (e.g., 20 nano-seconds in the FIG. 1 embodiment with a few meters of optical fiber) is fixed by the length of the optical delay line 104 that is part of the long optical path.

With continuing reference to FIG. 1, consider a high intensity return light pulse received by the detector system 100 from a cooperative target such as a retro reflector. As shown in FIG. 1, the light pulse returned by the retro reflector first travels down a receive Rx path 102 to a first optical beam splitter A; beam splitter A can be implemented, for example, in fiber optics technology. The optical beam splitter A directs a large portion, preferably the vast majority (e.g., 99%), of the return light energy on the receive Rx path 102 to the long optical return path on a long fiber optical delay line 104. The remainder, smaller portion of the return light energy (e.g., 1%) on the receive Rx path 102 is, in the FIG. 1 embodiment of the invention, directed by the beam splitter A to the short optical return path on a short fiber 106 to a second optical beam splitter B; beam splitter B can be implemented, for example, in fiber optics technology.

As further shown in FIG. 1, a large portion (e.g., 90-99%) of the energy on the short path fiber 106 is directed by the second splitter B along an optical path 108 toward a PIN detector 110, which can be, for example, a PIN diode or an Avalanche Photo Diode (APD). The detector 110 triggers, for example, a flip-flop to record the strong portion of the energy on the short path fiber 106 or an intensity level detector via an integrator or peak detector. The remainder of the light energy from the second beam splitter B, approximately 1000×-10, 000× attenuated, travels on optical fiber path 112 to an optical fiber combiner 114, which may have several forms, but likely will have only one combine function with the light energy on the long optical return path. The greatly attenuated pulse on optical fiber path 112 strikes detector 116 (e.g., an ADP), enabling the distance of the cooperative target from which light has been reflected to be accurately recorded and a stop pulse to be generated. The attenuation from the two beam splitters A and B is designed to reduce the intensity of this first pulse of light to be received by the detector 116 to within the dynamic range of the detector 116 and associated time-to-digital converter circuitry (not shown) when the return pulse received on receive Rx path 102 is from a cooperative target, e.g., a retro detector.

As discussed above, the long optical return path has entrained, in optical delay line 104, the majority of the optical energy of the return pulse on receive Rx path 102 at the time that the light on the short optical return path triggers the detector 116 and its time-to-digital converter. After the short path attenuated stop pulse is generated as described above, that is, the falling edge of the detector 116 has triggered the time-to-digital converter to stop recording light intensity, the large energy pulse from the optical delay line 104 arrives at the detector (ADP) 116 via the combiner 114 and is ignored by the time-to-digital converter.

In the case of a less intense ("normal") return light pulse from a non-cooperative target, the return light energy travels down the receive Rx path 102 to the first optical beam splitter A. As discussed above, the amount of energy lost in beam splitter A is approximately 1%, so attenuation is small. As further discussed above, beam splitter A causes the majority of the return light on receive Rx path 102 to enter the long optical return path on the optical delay fiber 104, while a small amount of light travels on the short optical return path on optical line 106 to the second beam splitter B. As discussed above, the majority of light directed to beam splitter B travels on optical fiber path 108 to the PIN detector 110. However, by design, in the case of a normal intensity return pulse, the energy on optical fiber path 108 is too small to trigger the PIN or APD detector 110. The greatly attenuated remainder of the light energy from beam splitter B travels on optical fiber path 112 to the detector (APD) 116 via combiner 114 and generates a small pulse that is below the dynamic range of the time-to-digital converter. Thus, the time-to-digital converter remains untriggered for this first, attenuated "stop" pulse.

The majority of the return energy returned from the normal target travels the long optical return path through the optical delay line 104, enters the combiner 114 and triggers the detector (APD) 116, approximately 20 nanoseconds later (in the disclosed embodiment of the invention).

Because both dynamic ranges, i.e. for high intensity cooperative targets and low intensity non-cooperative targets, are supported at the same time and the same detector 116 and its associated time-to-digital are used in both cases, the detector 116 and the time-to-digital converter by themselves cannot distinguish between a normal low intensity return pulse traveling the long optical return path and a high intensity pulse from a target located a few meters more distant but traveling the short optical return path inside the receiver optics. In one embodiment of the invention, the ambiguity is resolved by the detector 110 on the short optical return path. If a high intensity pulse is received, then the detector 110 will record a high intensity pulse or be triggered, as discussed above. If a low intensity pulse is received, then the detector 110 will record a low intensity pulse or not be triggered. As a consequence, when a range is recorded by the detector 116 and time-to-digital converter, the additional information provided by detector 110 resolves whether the short optical return path or the long optical return path was used and the range may be adjusted appropriately.

In another embodiment of the invention, the detected signal at detector 116 is used to resolve ambiguity; thus, only one beam splitter is needed as detector 110 is not used. After the detection of the first pulse, the time to digital converter can estimate when a second, high intensity pulse may arrive because the time separation between the two pulses is fixed by the optical delay line 104. Thus, after detecting a first pulse, the time to digital converter circuitry will arm a threshold detector with a flip-flop or an integrator for a short period of time to detect the existence of the second pulse. If a high intensity pulse has been received, then a second high energy pulse will arrive at detector 116 a fixed period of time after the first detected pulse and be detected. If a low intensity pulse has been received, then there will be no second pulse after the first pulse and no second pulse will be detected.

Thus, a light detection system in accordance with the present invention uses either the first pulse or the delayed pulse to measure time of flight. The retro detector system does not measure the polarization properties of the illuminated surfaces. The delay line is used to make one measurement and to increase the dynamic range. Those skilled in the art will appreciate that an adjustable attenuator may be needed to fine tune the placement of the duplicated dynamic range. The intensity of the first pulse and of the second pulse can be correlated to reduce false triggers, as one is the attenuated copy of the other.

It should be recognized that a number of variations of the above-identified embodiments will be obvious to one of ordinary skill in the art in view of the foregoing description. For example, it should be appreciated that the above-described concepts can be repeated more than one time to create many copies of the dynamic range, each with reduced sensitivity and time separation. Accordingly, the invention is not to be limited by those specific embodiments and methods of the present invention shown and described herein. Rather, the scope of the invention is to be defined by the following claims and their equivalents.

What is claimed is:

1. A light detection system for detecting return light energy reflected from a target object, the light detection system comprising:

a first optical beam splitter that splits the return light energy into a first splitter large light energy portion and a first splitter small light energy portion;

a second optical beam splitter that splits the first splitter small light energy portion into a second splitter large light energy portion and a second splitter small light energy portion;

a first light energy detector that receives the first splitter large light energy portion via a long optical path and the second splitter small light energy portion via a short optical path such that the second splitter small light energy portion arrives at the first light energy detector before the first splitter large light energy portion, and in the event that the second splitter small light energy portion exceeds a first threshold light energy level of the first light energy detector, generates a stop signal; and a second light energy detector that receives the second splitter large light energy portion and, in the event that the second splitter large light energy portion exceeds a threshold energy level of the second detector generates a latch signal or integrates to sufficient level, whereby, when the first light energy detector has generated the stop signal, the latch or integrator voltage level signal indicates that the stop signal was generated by the first light energy detector in response to the second splitter small light energy portion.

2. A light detection system for detecting a return laser light signal reflected from a target object, the light detection system comprising:

a first optical beam splitter that splits the return laser light signal into a primary laser light portion that comprises about 99% of the light energy of the return laser light signal and a secondary laser light portion that comprises about 1% of the light energy of the return laser light signal;

a second optical beam splitter that splits the secondary laser light portion into a low attenuation laser light portion that comprises about 90-99% of the light energy of the secondary laser light portion and a high attenuation laser light portion that comprises about 1-10% of the light energy of the secondary laser light portion;

a first photodetector having a first light energy threshold and that receives the low attenuation laser light portion from the second optical beam splitter and that, in the event that the low attenuation laser light portion exceeds the first light energy threshold, generates a latch signal or intensity level through integration; and a second photodetector having a second light energy threshold and that receives the high attenuation laser light portion from the second optical beam splitter and the primary laser light portion from the first optical beam splitter and that generates a stop signal when light energy received by the second photodetector exceeds the second light energy threshold, the latch signal generated by the first photodetector indicating that the stop signal generated by the second photodetector was generated in response to the high attenuation laser light portion received by the second photodetector from the second optical beam splitter.

3. A light detection system comprising:

a first optical beam splitter that splits light energy received by the first optical beam splitter into a large light energy portion and a small light energy portion;

a stop signal generator that generates a stop signal if light energy received by the stop signal generator exceeds a stop signal threshold level;

a long optical path connected between the first optical beam splitter and the stop signal generator to provide the large light energy portion to the stop signal generator at a first time;

a short optical path connected between the first optical beam splitter and the stop signal generator, the short optical path including a second optical beam splitter that splits the small light energy portion from the first optical beam splitter into a low attenuation light energy portion and a high attenuation light energy portion, the high attenuation light energy portion being provided to the stop signal generator in a second time that is shorter than the first time; and a latch signal generator or signal integrator connected to receive the low attenuation light energy portion, and that generates a latch signal if the low attenuation light energy portion exceeds a latch signal threshold level, the latch signal indicating that a stop signal generated by the stop signal generator is in response to the high attenuation light energy portion.

4. A light detection system comprising:

a first optical beam splitter that splits light energy received by the first optical beam splitter into a large light energy portion and a small light energy portion;

a stop signal generator that generates a stop signal if light energy received by the stop signal generator exceeds a stop signal threshold level;

a long optical path connected between the first optical beam splitter and the stop signal generator to provide the large light energy portion to the stop signal generator at a first time;

a short optical path connected between the first optical beam splitter and the stop signal generator to provide the small light energy portion to the stop signal generator at a second time that is shorter than the first time; and a latch signal generator or signal integrator connected to the stop signal generator which is armed for a fixed time period after the stop signal is generated to detect the presence of a second pulse, which, if detected, indicates that the response of the detector was from a high intensity received light energy signal.

* * * * *